United States Patent [19]

Buehler et al.

[11] Patent Number: 5,080,488

[45] Date of Patent: Jan. 14, 1992

[54] METHOD FOR EVALUATING SIGNALS OF A FIBER OPTICAL GYROSCOPE OR SAGNAC INTERFEROMETER

[75] Inventors: Wolfhardt Buehler, Munich; Hans Poisel, Dachau; Gert Trommer, Munich, all of Fed. Rep. of Germany

[73] Assignee: Messerschmitt-Boelkow-Blohm GmbH, Munich, Fed. Rep. of Germany

[21] Appl. No.: 508,294

[22] Filed: Apr. 10, 1990

[30] Foreign Application Priority Data

Apr. 12, 1989 [DE] Fed. Rep. of Germany ....... 3912005

[51] Int. Cl.$^5$ .............................................. G01C 19/72
[52] U.S. Cl. ..................................................... 356/350
[58] Field of Search .......................................... 356/350

[56] References Cited

U.S. PATENT DOCUMENTS

| 4,440,498 | 4/1984 | Sheem ................................. 356/350 |
| 4,479,715 | 10/1984 | Sheem ................................. 356/350 |
| 4,653,917 | 3/1987 | Moeller et al. ..................... 356/350 |

FOREIGN PATENT DOCUMENTS 2157425 10/1985 United Kingdom ............... 356/350

Primary Examiner—Samuel Turner
Assistant Examiner—LaCharles P. Keesee
Attorney, Agent, or Firm—W. G. Fasse; D. H. Kane, Jr.

[57] ABSTRACT

A method and system for evaluating signals from a fiber optical gyro employs a 3×3-coupler which makes it possible to ascertain a precise Sagnac-Signal in spite of the fact that the fluctuations of the optical characteristics of the fiber coil are unknown. Thus, a high precision is assured, while simultaneously reducing the quality requirments for the optical components of the system.

10 Claims, 1 Drawing Sheet

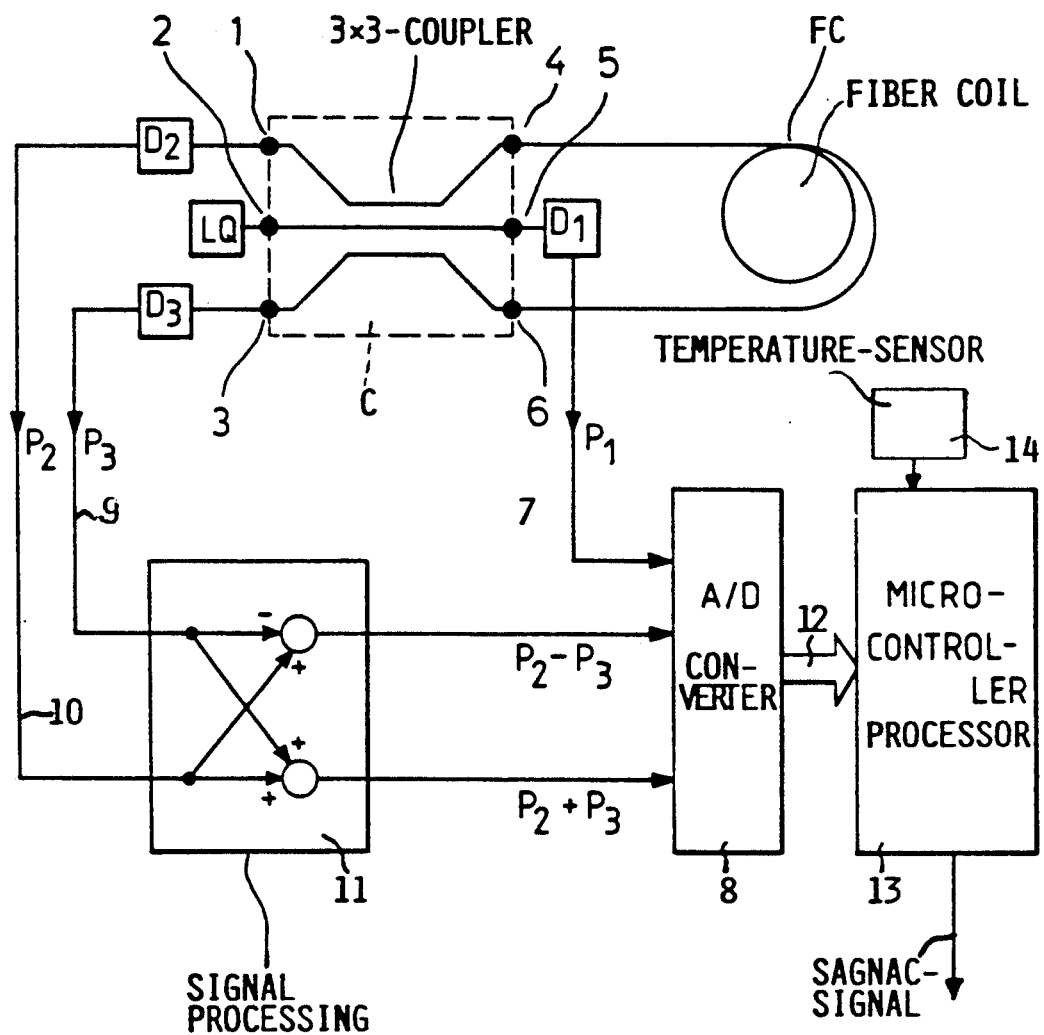

METHOD FOR EVALUATING SIGNALS OF A FIBER OPTICAL GYROSCOPE OR SAGNAC INTERFEROMETER

FIELD OF THE INVENTION

The invention relates to a method for evaluating signals from a fiber optical gyroscope having a 3×3-coupler, whereby the light source feeds light into a terminal of the 3×3-coupler while the fiber coil is coupled to respective terminals of the 3×3-coupler, and photo-diodes are connected to the remaining coupler terminals. Such gyro is known as Sagnac Interferometer.

BACKGROUND INFORMATION

U.S. Pat. No. 4,440,498 discloses a fiber optical gyroscope in which a 3×3-coupler is used for operation close to the quadrature point without using a modulator.

U.S. Pat. No. 4,479,715 discloses another fiber optical gyro equipped with a modified 3×3-coupler which derives the angular or rotational spin rate from the signals of the photo-diodes $P_1$ and $P_2$ in accordance with the relationship $$(P_1 - P_2)/(P_1 + P_2) = f(\Phi).$$

The advantage of this signal evaluation is seen in that the light intensity of the light source cancels itself so that fluctuations in the light intensity do not have any influence on the measured result.

The above described conventional fiber optical gyros and all other conventional gyros of this type, however, are subject to a number of problems outlined below. It is known that fiber optical gyros do not at all permit an operation with a reciprocal light path due to their construction required by the use of a 3×3-coupler. As a result, environmentally caused fluctuations of the transmission characteristics of the fiber optical coil are noticed in the form of a zero point drift and in a scale factor drift of the gyro signal. Such environmental fluctuations can, for example, be caused by temperature changes and variations in the pressure. The zero point errors can be avoided by using non-polarized light. However, the rather disturbing contrast variations of the interference signal, which variations cause said scale factor drift, remain because they are unavoidable. A precise analysis of the output signal shows for the output signals $P_2$ and $P_3$ of the detector photo-diodes $D_2$ and $D_3$ the following:

$$P_2 = v(A + kB \cdot \cos(\Phi - c)) \cdot I$$

$$P_3 = v(A + kB \cdot \cos(\Phi + c)) \cdot I,$$

when nonpolarized light is used. In the foregoing relationships the spin rate $\Omega$ and the Sagnac-Phase $\Phi$ are correlated with the scale factor s as follows:

$$\Phi = s \cdot \Omega.$$

Further, "v" represents a conversion factor for describing the efficiency of the photo-diodes and "I" is the intensity of the light source LQ. The constants "A", "B", and "c" are coefficients which result from the transmission characteristics of the 3×3-coupler.

However, the contrast factor "k" in the above relationship is variable. The contrast factor "k" depends on the magnitude of polarization coupling centers which are always present in glass fibers. Such polarization coupling centers are very sensitive to temperature and pressure changes. Thus, the respective value of "k" is unknown and hence falsifies the evaluation of the Sagnac-Phase $\Phi$ which needs to be found. As a result, the gyro or spin rate $\Omega$ is also falsified. For example, the evaluation method disclosed in U.S. Pat. No. 4,479,715 would have the following result:

$$\frac{P_2 - P_3}{P_2 + P_3} = \frac{\sin \Phi}{A/(kB \sin c) + \cot c \cdot \cos \Phi}.$$

If the coupler coefficients A, B, and c are known and constant, the right side of the equation shows the Sagnac-Phase $\Phi$ that needs to be ascertained. However, the fluctuating unknown contrast factor "k" is also part of the right-hand side of the equation. Therefore, an exact determination of the spin rate $\Omega$ is not possible by the method of U.S. Pat. No. 4,479,715.

In order to obtain a sufficiently accurate result with conventional evaluating methods, it would have to be tried to keep the magnitude of the above mentioned polarization coupling centers as small as possible. This could be achieved by selecting very expensive specialized light conducting optical fibers and strongly damping embedding masses and so forth. Such features could keep the contract factor "k" substantially constant. However, the effort and expense for a still unsatisfactory result are very high.

OBJECTS OF THE INVENTION

In view of the foregoing it is the aim of the invention to achieve the following objects singly or in combination:

to provide a simple and inexpensive method for avoiding the above outlined problems of the prior art, more specifically, to exactly determine the spin rate $\Omega$ of a fiber optical gyro, while keeping the effort and expense as small as possible;

to make sure that the three unknown factors or quantities $\Omega$, k, and I can be evaluated in an unambiguous manner or at least so that the undesirable influence can be eliminated; and to avoid the high quality requirements for the structural components of an optical fiber gyro, especially of the fiber coil or loop.

SUMMARY OF THE INVENTION

In the method according to the invention a light source is used which emits a broadband light that is substantially nonpolarized and which is fed or supplied into the 3×3-coupler. The determination of the angular or spin rate is accomplished with the evaluation of the photo-currents of the three photo-diodes connected to the 3×3-coupler, whereby an evaluation computer is used, capable of calculating the following equation:

$$\frac{P_2 - P_3}{P_2 + P_3 - \frac{2A}{D} P_1} \cdot \cot c = \tan(s \cdot \Omega),$$

wherein $P_1$, $P_2$, and $P_3$ are the above mentioned photo-currents of the respective photo-diodes, and wherein A, c, D, and s are coefficients which are independent of the spin rate, and wherein these coefficients are stored in the memory of the evaluation computer in the form of a microprocessor. It will be noted that the foregoing equation does not depend on the contrast factor, nor does it depend on the light intensity. In other words, the elements "k" and "I" have been eliminated. As a result, fluctuations of the light intensity cannot falsify the calculation of the spin rate, nor can the spin rate be adversely affected by the contrast factor "k". It should be mentioned here, the output signal $P_1$ of the first photo-diode $D_1$ is expressed as follows:

$$P_1 = v.D.I$$

wherein the coefficient D depends on the coupler characteristics. The substantial advantage of the teachings according to the invention is seen in that the quality of the fiber coil and of the other optical components, such as fiber splices, no longer have to satisfy the high quality requirements necessary heretofore. Additionally, it is immaterial for the costs of the microprocessor used for the signal evaluation, what kind of evaluation program is implemented in the microprocessor. Any nonsymmetric characteristics in the 3×3-coupler or in the photo-diodes can be compensated by storing in the memory of the microprocessor respective coefficients without thereby modifying the basic principle of signal evaluation disclosed herein.

BRIEF DESCRIPTION OF THE DRAWING

In order that the invention may be clearly understood, it will now be described, by way of example, with reference to the single FIGURE of the accompanying drawing, which shows a circuit diagram of a circuit arrangement according to the invention for the evaulation of a fiber optical gyro coil.

DETAILED DESCRIPTION OF PREFERRED EXAMPLE EMBODIMENTS AND OF THE BEST MODE OF THE INVENTION

A light source LQ feeds its light into the input terminal 2 of a 3×3-coupler C. The fiber coil FC is connected with its fiber ends to the terminals 4 and 6 of the coupler C. A first photodiode $D_1$ is connected to receive light from the terminal 5 of the 3×3-coupler. The electrical output signals $P_1$ are supplied through a conductor 7 to one input of an analog-to-digital converter 8. A second photo-diode $D_2$ is connected to the terminal 1 of the 3×3-coupler. A third photo-diode $D_3$ is connected to the terminal 3 of the 3×3-coupler. These further photo-diodes $D_2$ and $D_3$ produce second and third electrical signals $P_2$ and $P_3$, which are supplied through conductors 9 and 10 to respective inputs of a signal processing circuit 11 comprising summing networks to produce the sum and difference of the two photodiode signals $P_2$ and $P_3$. The outputs of the signal processing circuit 11 are connected to respective input terminals of the A/D converter 8. The analog input signals $P_1$, $P_2-P_3$, and $P_2+P_3$ are digitized in the analog-to-digital converter 8, which is connected with its output through a databus 12 to a microprocessor control circuit 13 which performs the calculations to determine the spin rate $\Omega$ and provides the "Sagnac" signal.

Forming the difference signal from the analog signals has the advantage that the high d.c. component of the signals $P_2$ and $P_3$ is eliminated in the difference formation so that only the signal component which truly represents the spin rate $\Omega$ remains for the digitalization which can thus be performed with a high precision. For the resolution at low spin rates it is thus no longer necessary to provide a high bit number for the A/D converter 8.

The summing signal $P_2+P_3$ on the other hand, is a measure for the scale factor in the mentioned signal evaluation. Thus, inaccuracies in the signal sum $P_2+P_3$ do not cause an offset, they merely cause a fluctuation of the scale factor.

It should be mentioned here that the invention is not limited to the use of the above mathematical equation. Rather, any mathematical equivalent evaluation equation may be employed, for example:

$$\frac{(P_2 - P_1) \cdot A/D}{(P_3 - P_1) \cdot A/D} = \frac{\cos(s \cdot \Omega - c)}{\cos(s \cdot \Omega + c)}.$$

The just given equation, however, has the disadvantage that the difference signal $P_2-P_3$ is not directly formed. Further, the person of ordinary skill in this art can apply the present teaching also to the case where the 3×3-coupler C is nonsymmetric and where, for example, the photo-diodes $D_1$, $D_2$, and $D_3$ have different efficiencies and/or amplification factors or gains.

The method according to the invention permits a signal evaluation in spite of the unknown fluctuations of the optical characteristics of the fiber coil and provide, nevertheless, a precise Sagnac-Signal, thereby permitting a high measuring precision while simultaneously reducing the quality requirements that must be met by the optical components of the present system.

According to the invention the coefficients A, c, D and s are determined in a calibration procedure which first involves measuring the photo-currents $P_1(\Omega')$, $P_2(\Omega')$, $P_3(\Omega')$ as functions of a known calibration spin rate $\Omega'$, and using the "fit" of the following function:

$$\frac{P_2(\Omega') - P_3(\Omega')}{P_2(\Omega') + P_3(\Omega') - \frac{2A}{D} P_1(\Omega')} \cdot \cot c - \tan(s \cdot \Omega') = 0.$$

According to a modification of the invention the above mentioned coefficients A, c, D, and s can also be ascertained on the basis of the measured photo-currents as a function of the calibration spin rate ($\Omega'$) by employing the "fit" of the following functions:

$$\frac{A}{D} + \frac{kB}{D} \cos(s \cdot \Omega' - c) - \frac{P_2(\Omega')}{P_1(\Omega')} = 0$$

$$\frac{A}{D} + \frac{kB}{D} \cos(s \cdot \Omega' + c) - \frac{P_3(\Omega')}{P_1(\Omega')} = 0,$$

wherein k and B are auxiliary coefficients providing a measure of the contrast of the interference signal of the 3×3-coupler C.

The above mentioned coefficients A, c, D, and s may also be determined in their dependency on the temperature. For this purpose, the fiber optical gyro is equipped with a temperature sensor 14. Additionally, a plurality of coefficients A, c, D, and s are stored in the memory of the microprocessor which then compares the stored coefficients with the current temperature and selects those coefficients which correspond to the currently measured temperature of the fiber gyro.

Although the invention has been described with reference to specific example embodiments, it will be appreciated that it is intended to cover all modifications and equivalents within the scope of the appended claims.

What is claimed is:

1. A method for evaluating signals from a fiber optical gyro having a 3×3-coupler, to determine an unknown spin rate ($\Omega$), wherein a light source (LQ) supplies light into a first terminal (2) of said 3×3-coupler, a fiber coil is connected to further terminals (4) and (6) of said 3×3-coupler while photo-diodes ($D_1$, $D_2$, $D_3$) are coupled to remaining terminals (1, 3, 5) of said 3×3-coupler, comprising the following steps:

(a) feeding from said light source (LQ) wide-band, substantially unpolarized light into the 3×3-coupler, (b) sensing light in three photo-diodes ($D_1$, $D_2$, $D_3$) to provide three photo-currents ($P_1$, $P_2$, $P_3$), (c) storing coefficients A, c, D, and s which are independent of said spin rate ($\Omega$) in a memory of a microprocessor to provide stored coefficients in said memory, (d) and determining in said microprocessor said unknown spin rate ($\Omega$) from said photo-currents ($P_1$, $P_2$, $P_3$) and from said stored coefficients by using the following equation:

$$\frac{P_2 - P_3}{P_2 + P_3 - \frac{2A}{D} P_1} \cdot \cot c = \tan(s \cdot \Omega),$$

whereby non-symmetric characteristics of said 3×3-coupler including non-symmetric characteristics of said photo-diodes, zero point drift, and scale factor drift are compensated.

2. The method of claim 1, wherein said coefficients A, c, D, and s are determined in a calibration procedure in which a known calibration spin rate ($\Omega'$) is employed, said calibration procedure comprising measuring calibration photo-currents $P_1(\Omega')$, $P_2(\Omega')$, and $P_3(\Omega')$ as a function of said known calibration spin rate ($\Omega'$), and determining said coefficients with the aid of the fit of the following function:

$$\frac{P_2(\Omega') - P_3(\Omega')}{P_2(\Omega') + P_3(\Omega') - \frac{2A}{D} P_1(\Omega')} \cdot \cot c - \tan(s \cdot \Omega') = 0.$$

3. The method of claim 1, wherein said coefficients A, c, D, and s are determined in a calibration procedure in which a known calibration spin rate ($\Omega'$) is used, said calibration procedure comprising measuring calibration photo-currents $P_1(\Omega')$, $P_2(\Omega')$, and $P_3(\Omega')$, and determined said coefficients, as a function of said known calibration spin rate ($\Omega'$) with the aid of the fit of the following functions:

$$\frac{A}{D} + \frac{kB}{D} \cos(s \cdot \Omega' - c) - \frac{P_2(\Omega')}{P_1(\Omega')} = 0 \text{ and}$$

$$\frac{A}{D} + \frac{kB}{D} \cos(s \cdot \Omega' + c) - \frac{P_3(\Omega')}{P_1(\Omega')} = 0,$$

wherein k and B are auxiliary coefficients providing a measure for the contrast of an interference signal of said 3×3-coupler.

4. The method of claim 1, wherein said coefficients A, c, D, and s are determined in a calibration procedure comprising measuring the temperature of said fiber optical gyro, storing said coefficients A, c, D, and s in a memory of said microprocessor, and selecting from said stored coefficients those coefficients which are allocatable to the currently measured temperature of said fiber optical gyro.

5. The method of claim 4, wherein said microprocessor has stored therein a plurality of individual coefficients for each of said coefficients A, c, D, and s, and selecting that set of individual coefficients, which is applicable to the currently measured temperature of said fiber optical gyro.

6. The method of claim 4, wherein said microprocessor updates said coefficients A, c, D, and s in response to the currently measured temperature of said fiber optical gyro.

7. The method of claim 1, wherein a mathematically equivalent function is used instead of said equation.

8. A system for evaluating signals from a fiber optical gyro, to determine an unknown spin rate ($\Omega$) of said gyro, comprising optical gyro means, a 3×3-coupler having six terminals three photo-sensors connected to three respective terminals of said 3×3-coupler, said gyro having a fiber optical loop or coil connected to two respective terminals of said 3×3-coupler, a light source connected to a respective terminal of said 3×3-coupler for supplying wide-band, substantially unpolarized light into said 3×3-coupler, signal processing means connected to outputs of said photo-sensors for receiving three photo-currents ($P_1$, $P_2$, $P_3$) from said photo-sensors, said signal processing means comprising a microprocessor including a memory having stored therein coefficients A, c, D, and s and independent of said unknown spin rate ($\Omega$), said microprocessor being capable of evaluating said photo-currents in accordance with the following equations:

$$\frac{P_2 - P_3}{P_2 + P_3 - \frac{2A}{D} P_1} \cdot \cot c = \tan(s \cdot \Omega),$$

whereby non-symmetric characteristics of said 3×3-coupler including non-symmetric characteristics of said photo-diodes, zero point drift and scale factor drift are compensated.

9. The system of claim 8, wherein said signal processing means comprise a first summing circuit for forming the difference between said photo-currents ($P_2 - P_3$), a second summing circuit for forming the sum of said photo-currents ($P_2 - P_3$), an analog-to-digital converter (A/D) connected with its inputs to receive said photo-current ($P_1$), said photo-current different ($P_2 - P_3$), and said photo-current ($P_2 + P_3$), and databus means connecting output means of said (A/D) converter to said microprocessor for performing said evaluating of said photo-currents to determine said unknown spin rate ($\Omega$).

10. The system of claim 8, wherein said optical fiber gyro comprises temperature sensor means for providing a temperature representing signal to said microprocessor to select a set of said coefficients A, c, D, and s in accordance with a currently measured temperature.

* * * * *

UNITED STATES PATENT AND TRADEMARK OFFICE
CERTIFICATE OF CORRECTION

PATENT NO.  : 5,080,488
DATED       : January 14, 1992
INVENTOR(S) : Wolfhardt Buehler et al.

It is certified that error appears in the above-identified patent and that said Letters Patent is hereby corrected as shown below:

[57] Abstract, line 7, replace "requirments" by --requirements--;

Claim 9, line 5, column 6, line 52, replace "$(P_2-P_3)$" by --$(P_2+P_3)$--;

Claim 9, line 8, column 6, line 55, after "photo-current" insert --sum--.

Signed and Sealed this

Thirteenth Day of April, 1993

Attest:

STEPHEN G. KUNIN

*Attesting Officer*     Acting Commissioner of Patents and Trademarks